US012694150B2

(12) United States Patent
Kamyshenko et al.

(10) Patent No.: US 12,694,150 B2
(45) Date of Patent: Jul. 28, 2026

(54) SYSTEMS AND METHODS FOR MANAGING DATA SECURITY

(71) Applicant: Dymium Inc., Los Gatos, CA (US)

(72) Inventors: Valentyn Kamyshenko, Los Gatos, CA (US); Igor Plotnikov, Sunnyvale, CA (US); Denzil Wessels, Los Gatos, CA (US)

(73) Assignee: Dymium Inc., Los Gatos, CA (US)

( * ) Notice: Subject to any disclaimer, the term of this patent is extended or adjusted under 35 U.S.C. 154(b) by 69 days.

(21) Appl. No.: 18/240,738

(22) Filed: Aug. 31, 2023

(65) Prior Publication Data

US 2024/0078337 A1     Mar. 7, 2024

Related U.S. Application Data

(60) Provisional application No. 63/466,641, filed on May 15, 2023, provisional application No. 63/403,651, filed on Sep. 2, 2022.

(51) Int. Cl.
*G06F 21/62*     (2013.01)
*G06F 16/21*     (2019.01)
(52) U.S. Cl.
CPC ........ *G06F 21/6245* (2013.01); *G06F 16/211* (2019.01)
(58) Field of Classification Search
CPC ........ G06F 16/20; G06F 16/21; G06F 16/211; G06F 21/60; G06F 21/62; G06F 21/6218; G06F 21/6245
See application file for complete search history.

(56) References Cited

U.S. PATENT DOCUMENTS

| | | | |
|---|---|---|---|
| 9,912,695 B1 | 3/2018 | Chao et al. | |
| 10,402,589 B1 * | 9/2019 | Madisetti | G06F 21/6218 |
| 11,531,846 B1 * | 12/2022 | Bodapati | G06N 20/00 |
| 11,899,806 B1 * | 2/2024 | Winters | G06F 16/252 |
| 12,095,796 B1 | 9/2024 | Godefroid | |
| 12,393,719 B2 | 8/2025 | Kamyshenko et al. | |
| 2014/0298469 A1 | 10/2014 | Marion et al. | |
| 2018/0018590 A1 * | 1/2018 | Szeto | G06N 20/00 |
| 2018/0191759 A1 * | 7/2018 | Baijal | G06F 30/20 |
| 2021/0004432 A1 | 1/2021 | Li et al. | |
| 2023/0208828 A1 | 6/2023 | Kolodziej | |
| 2023/0289278 A1 * | 9/2023 | Badrinath | G06F 11/3684 |
| 2025/0013773 A1 | 1/2025 | Kamyshenko et al. | |
| 2025/0335622 A1 | 10/2025 | Kamyshenko et al. | |

* cited by examiner

*Primary Examiner* — D'Arcy Winston Straub
(74) *Attorney, Agent, or Firm* — Carr & Ferrell LLP

(57) ABSTRACT

Exemplary embodiments for data security include a data access proxy coupled with a database, further coupled with a server configured to operate the data access proxy to: identify a user and request to access a data item; validate the user and request, including inspecting the user's identity, evaluating the user's history, and evaluating permissions and restrictions associated with the user and the data item; access the database to retrieve the data item; inspect security attributes related to the data item; and transform the data item based on one or more privacy rules, including redacting the at least one data item, deleting information from the at least one data item, substituting information from the at least one private data item with other information, adding information to the at least one data item, providing synthetic data as a private data item, or providing proxy data for the data item.

20 Claims, 6 Drawing Sheets

SYSTEMS AND METHODS FOR MANAGING DATA SECURITY

CROSS-REFERENCE TO RELATED APPLICATIONS

The present application claims the priority benefit of, and priority to, U.S. Provisional Patent Application Ser. No. 63/403,651 filed on Sep. 2, 2022, and U.S. Provisional Patent Application 63/466,641 filed May 15, 2023, both of which are hereby incorporated by reference in their entireties.

FIELD OF INVENTION

The various exemplary embodiments herein generally relate to data security, ease of use, and integration. More particularly, the various exemplary embodiments herein relate to systems and methods of providing data security via a database proxy engine positioned within a network flow between a database source and a user or a computer system accessing the database source. Additionally, the various exemplary embodiments herein solve the challenges of cost and time associated with a data migration, the time and effort to utilize data from disparate sources, and balance data protection with data access.

BACKGROUND

Providing security to network devices or a data center is an important concern as data security attacks are becoming increasingly prevalent. Multiple security features may be implemented at different network layers to protect networks, data, and services from malicious attacks. The traditional approach to data protection is founded on the concept of perimeter protection with firewalls as controlled access points. One type of such firewall is a traditional Open Systems Interconnection (OSI) layer 3-4 solution that checks for Internet Protocol (IP) addresses and ports and blocks undesired traffic based on this information. Such a solution is strictly based on transport protocol, unaware of the payload. A more modern take on this approach is a protocol-aware OSI layer with multiple firewalls that adds the art of Intrusion Protection System (IPS). The system inspects the traffic, finds dangerous patterns, and provides or blocks access. However, this approach is becoming less and less productive due to protocols becoming end-to-end encrypted, such as from the clients to the applications.

Another common approach is another type of firewall, known as a Web Application Firewall, which inspects the HTTP requests and responses from and to a web application. The firewall looks for threats like SQL injection and data leakage. However, the traffic or requests that the firewall can inspect are very indirect and can be difficult to interpret and act upon. Therefore, threats of accessing data via malicious users are still present.

SUMMARY OF EXEMPLARY EMBODIMENTS

The present disclosure relates to providing data security systems and methods for protecting data within a database.

An exemplary system and method of implementation and use may include at least one data access proxy communicatively coupled with at least one private database, the at least one data access proxy further communicatively coupled with at least one server, the at least one server configured to operate the at least one data access proxy to:

identify a user and a request from the user to access at least one data item stored in the at least one private database; validate the user and the request, the validation including inspecting the user's identity, evaluating the user's activity history, and evaluating permissions and restrictions associated with the user and the at least one data item; access the private database to retrieve the at least one data item; inspect one or more security attributes related to the at least one data item; and transform the at least one data item based on one or more privacy rules, the transformation including one or more of the following: redacting the at least one data item, deleting information from the at least one data item, substituting information from the at least one private data item with other information, adding information to the at least one data item, providing synthetic data as a private data item, and providing proxy data for the at least one data item.

Exemplary systems and methods may further include providing a response to the user, the response comprising a transformed version of the requested data item, the transformed version being accessible to the user by way of the data access proxy; as well as operate the data access proxy to provide schemas of introducing misinformation as part of the response, the misinformation functioning as a tracker for tracing a flow of information and identifying a malicious user.

A further exemplary system and method of implementation and use includes at least one artificial intelligence resource comprising at least one named-entity recognition model, at least one large language model, and at least one artificial intelligence application supported by a neural network; and at least one server communicatively coupled to the at least one artificial intelligence resource and further communicatively coupled to at least one private database, the at least one server configured to operate the at least one artificial intelligence resource to identify a user and a request from the user to access at least one data item stored in the at least one private database; validate the user and the request, the validation including inspecting the user's identity, evaluating the user's activity history, and evaluating permissions and restrictions associated with the user and the at least one data item; analyze user activity associated with the user for suspicious activity; access the private database to retrieve the at least one data item; inspect one or more security attributes related to the at least one data item; transform the at least one data item based on one or more privacy rules, the transformation including: redacting information from the at least one data item, deleting information from the at least one data item, substituting information from the at least one private data item with other information, adding information to the at least one data item, providing synthetic data as a private data item, and providing proxy data for the at least one data item; reconstitute the at least one data item in a response to the request; and transmit the response with a transformed version of the at least one data item to the user or a designated recipient.

A further exemplary method may include providing a data access proxy, the data access proxy communicatively coupled to a private database shielding the private database, the data access proxy functioning as a Semantic Data Proxy (SDP), wherein a request from a user to access a data item such as personally identifiable information (PII) data item from within the private database is directed to the SDP, wherein the SDP mimics the private database; processing the request, wherein processing the request comprises identifying the request, inspecting the request, validating user's identity, accessing the private database to retrieve the requested data item, preparing the data item, transforming the data item according to the privacy rules associated with the private database, and providing a response to the user, the response comprising the requested data item, wherein the user accesses the private database via the data access proxy, such as SDP preventing user's direct access of the private database.

The systems and methods disclosed herein further provide for controlled access to the private database source (or file, stream and/or a data lake) via the data access proxy or SDP, wherein SDP functions as an intermediatory between the user and the private database and serves as a checkpoint, wherein the SDP (i) inspects the identity of the user requesting access, (ii) authenticate the request, (iii) validate user's identity, (iv) evaluate user's behavior, (v) evaluate user's history, (vi) evaluate permissions and restrictions associated with the data and with the user, or (vii) inspect attributes related to data such as confidentiality of the data or sensitivity of the data.

The user interacts with the data access proxy or SDP as if the user is interacting with a private database.

In various embodiments, the present disclosure further relates to preventing unauthorized access to a private database comprising providing a data access proxy, a private database accessible from the data access proxy via reverse tunneling infrastructure (meshserver/meshclient) wherein the data access proxy mirrors the private database, receiving a request to access a private data item from a user, wherein a user is sending a request to the data access proxy screen the request, wherein if the user has permission to access the private data item, the data access proxy access the private database, retrieve the data item, prepare the data item, transform the data item and provide a response to the user, wherein if the user has no permission to access to the private data item, the data access proxy either deny the request, block the access, provide synthetic information as a form of a data item, provide redacted information as part of a data item or provide misinformation as a data item. In various embodiments, identifying the request comprises comparing the user's identity with information from a user database. In various other embodiments, the user database is associated with the private database and stores a plurality of user information.

In various embodiments, transforming the private data item or data item comprises redacting the data item, deleting information from the private data item, substituting information from the private data item with other information, adding information to the private data item, providing synthetic data (that is consistent between tables, data sources, etc.) as a private data item, or providing proxy data as a data item. In various other embodiments, a response may be a redacted data item, a private data item, a PII data item, a synthetic data item, a proxy data item, or any other form of data, collection of information or any information presented to the user.

In various embodiments, validating a user's identity comprises validating the user's identity using an identification system such as an Object Identifier system (OID), including information such as user's name, user's role, user's private database permissions, user restrictions to access private database, user's past requests, user's frequency of requests and so forth to evaluate user's history and behavior. An object identifier (OID) is a string of decimal numbers that uniquely identifies an object. These objects are typically an object class or an attribute.

In various embodiments, preparing the data item may comprise extracting information from a single database and/or data source, extracting information from more than one database, extracting and combining information from more than one database, or extracting and transforming the information based on the user's identity and corresponding permissions.

BRIEF DESCRIPTION OF THE DRAWINGS

The accompanying drawings, where like reference numerals refer to steps of the process and embodiments, together with the detailed description below, are incorporated in and form part of the specification and serve to illustrate further embodiments of concepts that include the claimed disclosure and explain various principles and advantages of those embodiments.

The process and composition disclosed herein have been represented where appropriate by conventional symbols in the flowcharts, photographs, or drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
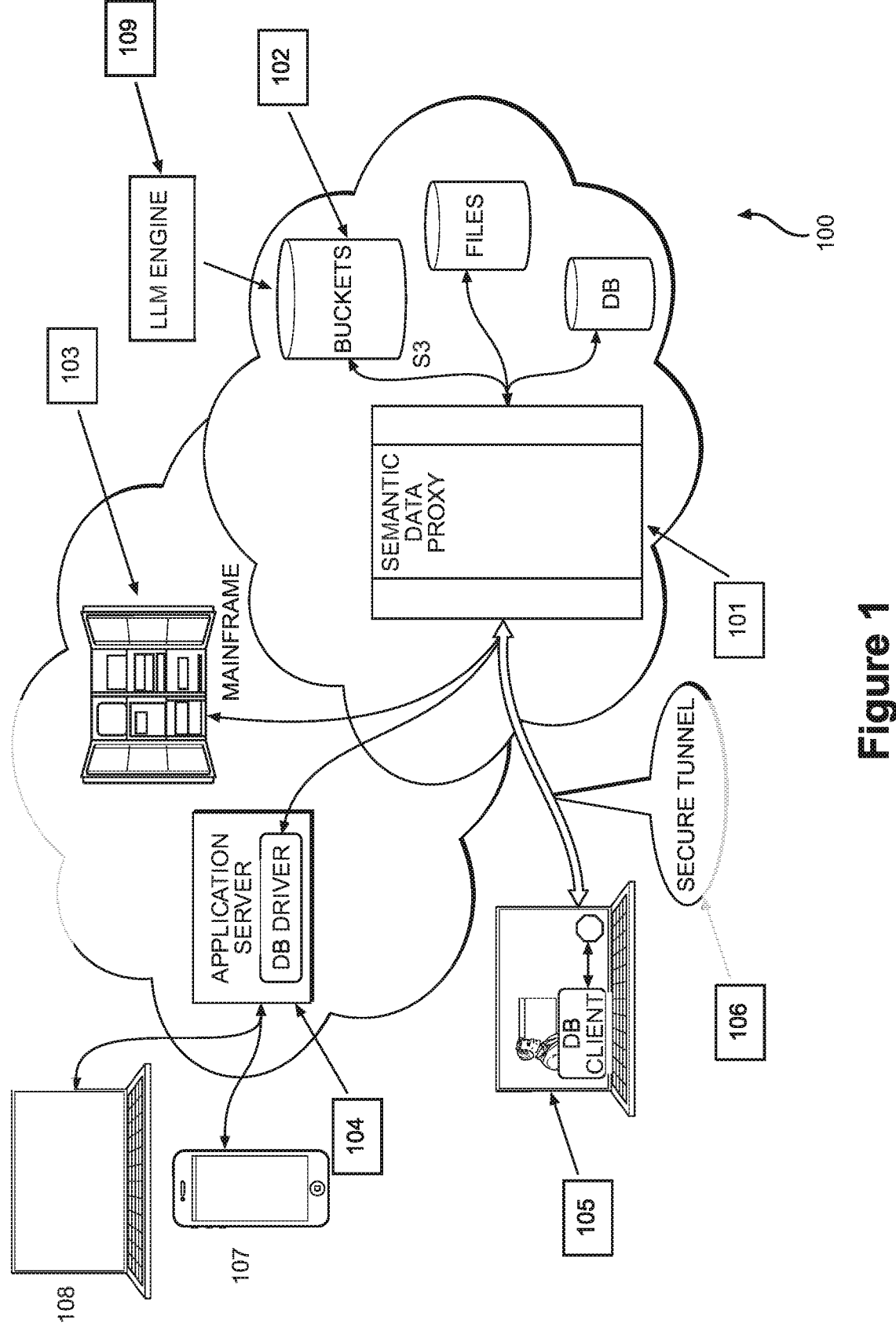
FIG. 1 illustrates an embodiment of the deployment of the disclosed technology.

While the presently disclosed systems and methods are susceptible to embodiment in many different forms, there are shown in the figures and will herein be described in detail several specific embodiments with the understanding that the present disclosure is to be considered as an exemplification of the principles of the present technology and is not intended to limit the technology to the embodiments illustrated.

In summary, provided herein are data security systems and methods for providing controlled and protected access to a private database via a data access proxy, the data access proxy being located within the network flow between a user and the private database, and wherein the data access proxy shields and mimics a private database. When a user accessing the private database interacts with the data access proxy, the data access proxy inspects the user to check the user's and the request's authenticity. The data access proxy interacts with the private database to retrieve the requested data, transform the data, and provide a response, thereby providing controlled access to and protection for the private database engine, wherein the user has no direct access to the private database.

Related applications may use alternative terms for a data access proxy, including proxy database, ghost database, or Semantic Data Proxy (SDP). In general, these terms are interchangeable and refer to the use of a proxy terminal by which to access data stored in one or more private databases.

Context, however, may indicate a specific or alternative functionality or purpose as described herein.

The data access proxy, also referred to as Semantic Data Proxy or SDP, inspects every data request received from any user, inspects responses before releasing the data item, modifies the request based on privacy policies or protocols associated with the request or with the user requesting a data item, or modifies responses before releasing the data item.

A private database may be any database or data source, such as but not limited to files, S3 buckets, data warehouses, or data lakes. A user may be accessing or requesting access to a database through an external source such as a local analytics program, Software as a Service (SaaS), or a Jupyter interactive environment to a local address. The database may be a private database, a public database, a private cloud, a cloud storage, a data storage engine, a server with a plurality of databases, a network of databases, any destination database, or any source of collective information to which a user may request access.

The disclosed methods and systems prohibit users' direct access to the private database, routing any such access through the SDP.

In many embodiments, a user may connect to the SDP using a native database protocol, for example, PostgreSQL. SDP may present multiple network interfaces that implement various data access protocols, such as SQL, NoSQL, flavors, REST, GraphQL, etc.

In these and further embodiments, if the data sought is not sensitive, the data item may be prepared and presented to the user in plain text, or in the same format in which it is stored in the private database, without modification or redaction.

If, in the alternative, the information sought is sensitive in nature, the SDP may modify the data in accordance with the owner's data access policy rules. For instance, the data may be partially redacted, or the data access policy rules may define parameters regarding which users have access, what types of data are accessible to a type of user, and how much data is available to a type of user. The user may then receive a redacted or substitute data item with alternative information, or proxy information. The user would have no direct access to the private database, but would be directed to the SDP, thereby protecting data from unauthorized access and threats. The proxy information may function as a tracker to trace the user's activities.

For example, a user may be a customer being assisted by technical support staff. The technical support person may or may not know the real name of this customer, and the information provided to the technical support person may be a proxy name for privacy reasons. The system will then address the customer with a proxy name, effectively shielding the customer's identity. As a further example, a user may request a list of customers for monthly sales analysis. The request may be routed via the SDP, which redacts personally identifiable information (PII) from the list and provides only the monthly sales numbers for analysis.

As a further example, a user such as a bank employee helping clients open a new bank account may access a defined data item from the database and may subsequently attempt to access credit card information for multiple accounts. The request will be routed to the SDP, which will inspect the request. Based on the user's role and past behavior, the SDP would raise concerns regarding the request. The SDP may, for example, alert higher authorities in the organization of a security breach, block the access, deny the information, provide proxy information, or provide synthetic information to track the user's activities.

In various embodiments, the systems and methods described herein protect against unauthorized access wherein a request to access the database is directed to the SDP. The SDP inspects the request by scanning the user making the request, nature of the request, type of information requested, and amount of information requested. If, for example, the request includes access to an extensive database or a download of a large number of files, the request can be inspected before processing. The presence of the SDP serves as a protective wall or a firewall between the user and the private database, providing controlled access to the database.

The technology disclosed herein further provides methods for developing database access schemas for preventing unauthorized access or maintaining controlled access to data within a database.

In various embodiments, the methods and systems provided herein provide schemas of introducing misinformation or synthetic information as part of the requested data provided to the user. The synthetic information may function as a tracker for tracing the flow of information and identifying the user's identity, such as a data breacher or a hacker. The synthetic information or the misinformation would mirror the actual information, thereby avoiding alerts that a tracker is installed in the requested data.

In various embodiments, the systems and methods provided herein include organizing the data within the database. For example, methods may be performed such as identifying the data and organizing the data based on attributes defining the data, such as confidentiality associated with the data, the sensitivity of the data, type of data, nature of the data, field of data, a quantity of data, and so forth.

In various embodiments, the disclosed technology provides for an automatic pre-detection of sensitive information and PII wherein the system searches and extracts patterns within columns or databases and associates the pattern with the known class of PII. The technology helps identify the type of data and amount of data, segregate the sensitive information from non-sensitive information, identify classified information, identify rules for different sets of data, and develop policing for accessing the data, such as HIPAA or Zero Trust policies.

As used herein, Zero Trust security generally means that no one is trusted by default from inside or outside the network, and verification is required from everyone trying to gain access to resources on the network. This added layer of security has been shown to prevent data breaches.

In various other embodiments, the systems and methods provided herein provide for an automatic pre-detection of sensitive information and PII, wherein the system searches to extract a subset of the data from the database and searches for the PII in the data itself. This can be achieved with pattern searching or with a neural network providing faster access and response to data requests wherein some of the responses are added as default responses, reducing the time of responses to a data request and reducing the time to configure the policy for a database search.

An exemplary system and method may include performing authentication by way of the SDP. Existing authentication mechanisms may be used. Integration and use are streamlined from the start. Multiple logins are not required. A connector may be employed that may communicate with an organization's database. In this way, an organization's database does not need to be communicatively coupled with outbound systems and may not even need Internet access. As a result, security is enhanced. Additionally, the exemplary systems and methods described herein may automatically set up the data so that it may be presented to the user on a need-to-know basis consistent with any applicable data regulations, such as those given for a particular geographic region.

In some exemplary systems and methods, within databases one may go from unstructured to structured, or from structured to unstructured. Conversions may be performed, such as from a Mongo DB to an SQL database. One may create a virtual database by supplying it with a plurality of Application Programming Interfaces (APIs). Additionally, data may be obfuscated, redacted and or blocked.

As another example, a use case is provided for a merger between organizations with common customers. A single query may query the loyalty programs of all organizations to determine the total number of points and point distribution for any particular customer. The time savings of this methodology versus going from database to database is tremendous. Additionally, different programming languages may be involved. Programing languages, protocols, application programming interfaces ("API's") in addition to Structured Query Language ("SQL") may be used on both sides (i.e., customer side and/or data silo side).

Further systems and methods may implement machine learning and artificial intelligence for performing the functions of the SDP. Such sources may be implemented using an artificial intelligence resource comprising, for example, at least one named-entity recognition model, at least one large language model, and at least one artificial intelligence application supported by a neural network. The artificial intelligence resource may be coupled to one or more servers and further coupled to at least one private database. The servers may be configured to operate the at least one artificial intelligence resource to identify a user and a request from the user to access at least one data item stored in the at least one private database; validate the user and the request, the validation including inspecting the user's identity, evaluating the user's activity history, and evaluating permissions and restrictions associated with the user and the at least one data item; analyze user activity associated with the user for suspicious activity; access the private database to retrieve the at least one data item; inspect one or more security attributes related to the at least one data item; transform the at least one data item based on one or more privacy rules, the transformation including: redacting information from the at least one data item, deleting information from the at least one data item, substituting information from the at least one private data item with other information, adding information to the at least one data item, providing synthetic data as a private data item, and providing proxy data for the at least one data item; reconstitute the at least one data item in a response to the request; and transmit the response with a transformed version of the at least one data item to the user or a designated recipient.

As used herein, the term language model generally refers to a probability distribution over sequences of words. Language models generate probabilities by training on large and structured sets of text, or text corpora. A single text corpus may include a single language or many languages, and may have various levels of structure based on, for example, grammar, syntax, morphology, semantics, and pragmatics.

A large language model, or LLM, refers to a language model consisting of a deep learning architecture that is trained on large quantities, often tens of gigabytes, of unlabeled text using self-supervised learning or semi-supervised learning to produce generalizable and adaptable output. The deep learning architecture may be comprised of a neural network with billions of weights or parameters. In some embodiments, the neural network may be a transformer, which uses parallel multi-head attention mechanism, or alternatively the neural network may be recursive, operating in sequence.

As used herein, Artificial Intelligence Resource refers to a collection of AI programs and AI engines for determining an optimal program for a particular task. The Artificial Intelligence Resource may, for example, receive a query from a user in plain text and use machine learning techniques to determine the content of the request, such as by Named-Entity Recognition (NER) to recognize names, titles, and other specific information within a data item. The NER may be trained on data pertaining to names.

The user query may contain, for example, a personnel file or patient record. The AI resource may pass the request to a Named-Entity Recognition model, which may detect that sensitive information such as personally identifiable information (PII) is included in the data item and may alert the AI resource. The AI resource may then process the response with a large language model, whereby the large language model may, for example, use predictive text to prepare a redacted or altered version of a response, or to generate synthetic data to mask the personally identifiable information. The large language model may also be used to generate and validate code for a security measure, including comments within code that can be used to track a user's subsequent activity.

Machine learning techniques such as neural network applications may be used to recognize suspicious activity. For example, the AI resource may direct information associated with a user, including user history and behavior, to a neural network application for detecting anomalous or outlier activity for the user. The neural network application may be trained on query history data to recognize routine, conventional activity and anomalous activity associated with a category of user, such as common and anomalous query types and sudden changes in user activity.

In these and further embodiments, a company may use a chatbot supported by a large language model. The large language model may be trained on a corpus of company files, emails, chats, images, documents, and other organizational legacy resources.

In general, a company's legacy resources will have access controls attached, such as access-control lists (ACLs). As used herein, an access control list generally refers to a list of permissions associated with a system resource (object or facility) that may specify, for example, which users or system processes are granted access to which resources, as well as what operations are allowed on given resources.

When a large language model is trained on an organization's legacy resources and used to support a chatbot, access controls must be accounted for.

Exemplary embodiments include a data security system that accounts for access controls using artificial intelligence resources to detect suspicious, malicious, or unauthorized behavior. As noted previously, the artificial intelligence resource may include a named-entity recognition model that detects words of concern in a received query. However, it is possible to have a question posed to the artificial intelligence resource that is sensitive in nature, even without specific words of concern. The artificial intelligence resource may thus include additional machine learning functions, such as object or optical character recognition (OCR), text or image classification, and probabilistic reasoning.

For instance, when a query from a particular user or particular type of user changes in scope or frequency, the artificial intelligence resource may use probabilistic reasoning to classify the behavior as suspicious. A sudden increase in queries for sensitive matter such as personally identifiable information, especially when such queries are concentrated in a recognizable geographic area or category of user, may warrant a determination of suspicious activity. Suspicious queries may include recognizable characters, text, source code, or images.

The artificial intelligence resource may then communicate its determination to a server supporting the organization's access controls. The server and artificial intelligence resource may thus function as an access proxy ensuring data security for the organization.

An exemplary method may include:

1. Receiving a request to access an AI resource. In various exemplary embodiments, an AI resource may function as the AI resource of a plurality of AI programs, knowing the optimal AI program to which to direct a query. Criteria such as data quality, performance, or security may be used to make such decisions.

In various exemplary embodiments, a browser widget may be employed that would resemble a large language model application like ChatGPT for entering a query. The widget may also include an enterprise policy control interface.

2. Sanitizing the request of personally identifiable information, trade secret information, HIPAA information, GDPR information, and other sensitive information. Additionally, transformation of requests may also be automatically performed, such as the elimination of hyphens from social security numbers. The possibilities are limitless and may be defined by the users or customers.

3. Transmit the request to the AI resource. In some situations, the request may be in the form of an automated request for a dataset. In other embodiments, the request may be defined by a customer.

Additionally, a set of criteria may be defined to direct the transmittal of the request. For example, a financial budget or an estimated threshold by a user, department, or group may be established for the transmission of requests.

4. Receive a response to the request from the AI resource.

5. Analyze the response for anything suspicious, such as malware. Through generative AI, attackers may generate new and complex types of malware, phishing schemes, and other cyber dangers that can evade conventional protection measures. The exemplary systems and methods described herein may identify and neutralize such threats or vulnerabilities. Additionally, source code generated may be validated, including any associated licensing in an effort to prevent or eliminate the chances of intellectual property infringement or infringement of international law or policy. For example, when a request is for source code to perform a particular function, the system may perform quality control. Additionally, as described herein, a risk score may be generated. Comments may be included with source code. The comments may also include a tracking token. Multiple programming languages may be generated or supported.

Additionally, responses may be received from a plurality of AI resources and compared and/or analyzed. Potential errors may be identified and/or remediated. It can also be an AI resource that can interpret other AI responses. In various exemplary embodiments, a preferred list of AI resources may be generated and/or automatically updated. Various scores for items such as response security may be generated and utilized. Iterative methodology (including algorithms) may be generated for the direction of entered requests. Criteria such as latency may also be used for the direction of entered requests. A plurality of responses from different AI resources may be compared, combined, and/or edited to create a single response. Voting logic may be utilized to remove outlying responses. Furthermore, load balancing techniques may be used for directing a plurality of requests.

6. Reconstitute the response with the sanitized information (e.g., Personally Identifiable Information ("PII") and/or secrets). Synthetic data may also be inputted, in some cases resembling the PII and/or secrets. In various exemplary embodiments, received code may be compiled and/or signed and sent to a cloud resource A dashboard including metrics with respect to the potential leakage of PII and/or secrets may be generated in an effort to quantify the quality of various AI resources and/or the quality of requests being submitted by particular individuals, organizations, etc. where the quality may be created by a human, machine and/or combination thereof. Furthermore, a normalized score may be generated to reflect the riskiness of the original requester. Risk may be defined in terms of the entry of PII and/or secrets.

7. Transmit the reconstituted response to the original submitter and/or to a designated recipient.

8. In the event an AI resource is compromised (e.g., breached or acquired by another vendor with conflicting interests or the like), a kill switch mechanism may be implemented to minimize or eliminate any damage to requesting parties operating on the system described herein. For example, an AI resource may be partially or completely disabled while allowing an authorized administrator to override and/or remediate the disabled AI resource.

Although references may be made to ChatGPT, it should be understood that this is by example and by no means limited to ChatGPT. Other similar applications and/or AI engines may be employed.

FIG. 1 illustrates an embodiment of the deployment of the disclosed technology with multiple data consumers (100) wherein Semantic Data Proxy ("SDP") (101) is positioned within the network flow between the database (104, also referred to as an application server) and a user (105). The SDP is provided access to unencrypted data present within various data sources, such as an application server (104), a device (107), a computer device (108), or the mainframe (103). The SDP (101) functions as a data access proxy comprising files, at least one database, S3 buckets (102) or other collection collections of information wherein a user accessing the database is directed to the SDP. The SDP may mimic a database (104) comprising components of a real database, such as private data wherein the user accesses the SDP as if accessing the private database. The user may be a client, a customer, an employee of an organization, a data scientist, a web server, a data consumer or any user who needs to or is accessing the database. FIG. 1 shows a user (105) accessing the database from a computer connected to an internet service. The user (105) is directed to the SDP, wherein the SDP provides a secure tunnel (106) over an encrypted authenticated connection to connect the local application to a local host socket.

Figure 2:
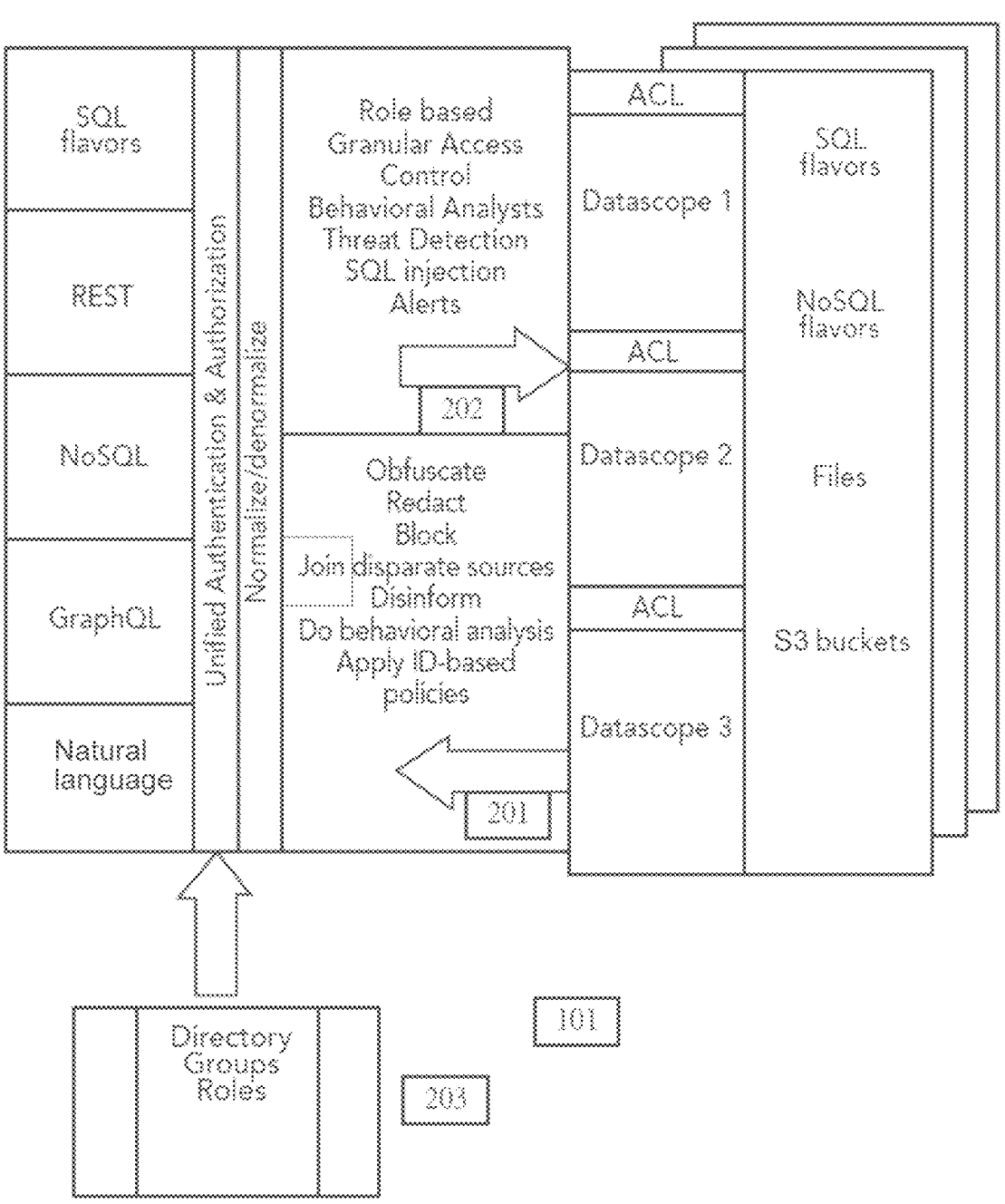
FIG. 2 illustrates a functional diagram of an embodiment of the disclosed technology.

FIG. 2 is a functional diagram of an embodiment of the present technology. As shown in FIG. 2, the data request flow is from left to right (202), and the response flow is opposite (201). The figures provide that the SDP (101) provides a protocol layer facilitating client connections wherein the SDP authenticates the user requesting data or information. The authentication process may comprise identifying information such as the role of the user, identity of the user or so forth from a user directory (203). The directory may also define a data access policy, a user database and other related information necessary to inspect the user's identity and data. The SDP may then normalize the request, such as by converting the request into a standard dialect of the SQL language. As provided, the data access policy within the SDP may provide for role-based granular access control, wherein the ghost database has access to the control list and inspects the user's request based on the information from the directory. The SDP may perform behavioral analysis based on the history of the user and user's associated benign or malicious behavior. For example, if the user's behavior is suspicious, the user will be flagged and the activities will be monitored further, or the user may not be allowed to access the database or retrieve any information from the database. Suspicious behavior may be determined from outliers in user activity, such as sudden changes in the amount or type of data sought by the user. If the user is requesting access that is beyond the scope of permissions for the particular user, the user will not be provided with any access to any information identifying threats to the data.

Figure 3:
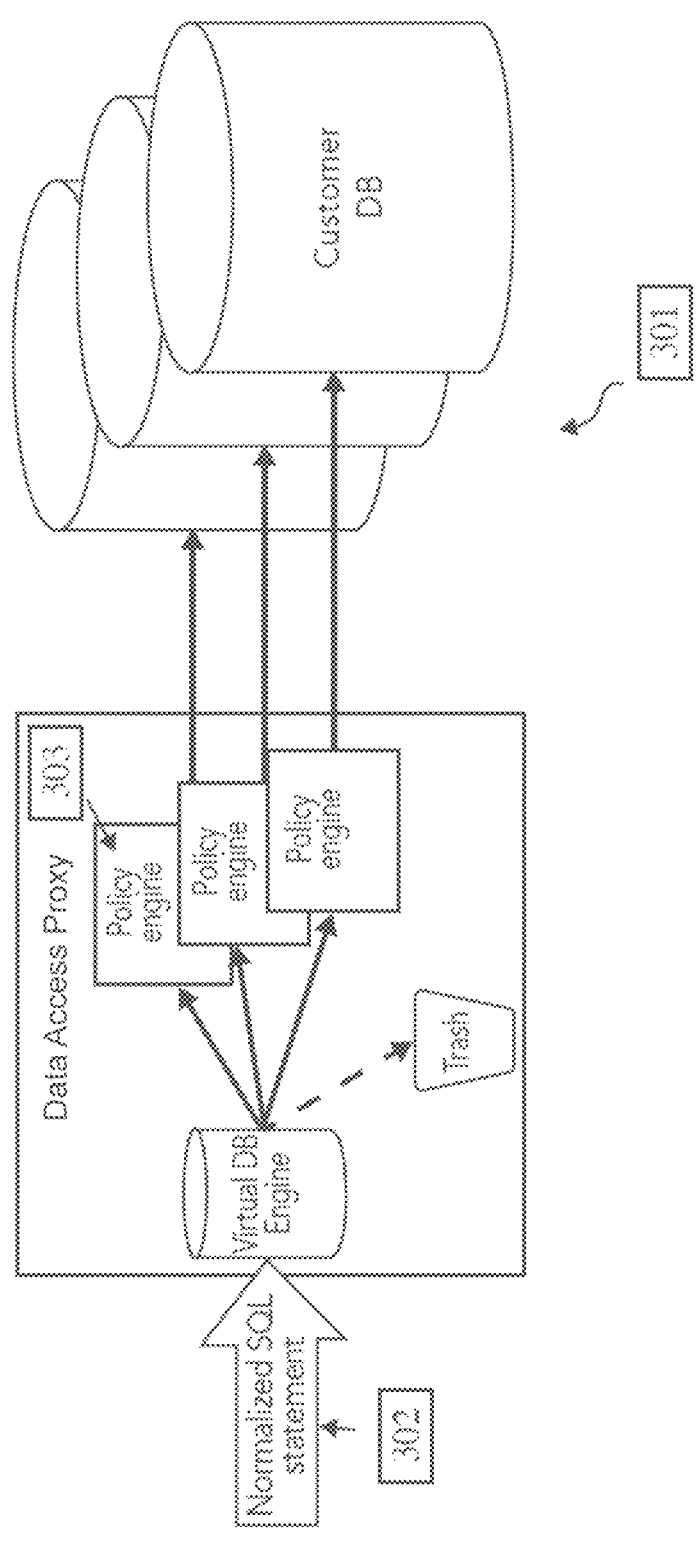
FIG. 3 illustrates an operational embodiment of the disclosed technology.

In various embodiments, the ghost database implements a virtual database or a virtual warehouse combining multiple connections to data sources and presenting a unified view of the data. In various embodiments, this unified view of the data may be an SQL database comprising a tightly defined subset of multiple data sources. For example, two different tables with a column containing social security numbers (SSN) can be configured and a "join" function can be performed between the tables on the SSN values with the obfuscated result. In this way, the data consumer obtains a synthetic SSN. The data sources requests may be denormalized to the data sources' protocols for those data sources. These protocols may have variations in format, such as different SQL implementations, including PostgreSQL, Oracle DB, MySQL, and others. FIG. 3 illustrates a ghost database operation (301) as per the methods and systems described herein, wherein a ghost database receives a request for data as a normalized input (302). The ghost database of SDP splits the request into subsets of requests based on the initial request's attributes, then directs those subsets to corresponding databases (104). Each subset of requests is evaluated as per the access policy (303) associated with the corresponding subset such that the database provides the limited data as in the requested subset as schemas and tables. The data is routed back to the SDP wherein the SDP combines the data, transforms the data, and sends a response. The process ensures that every request is routed to its corresponding database per the access policy associated with such a request.

Figure 4:
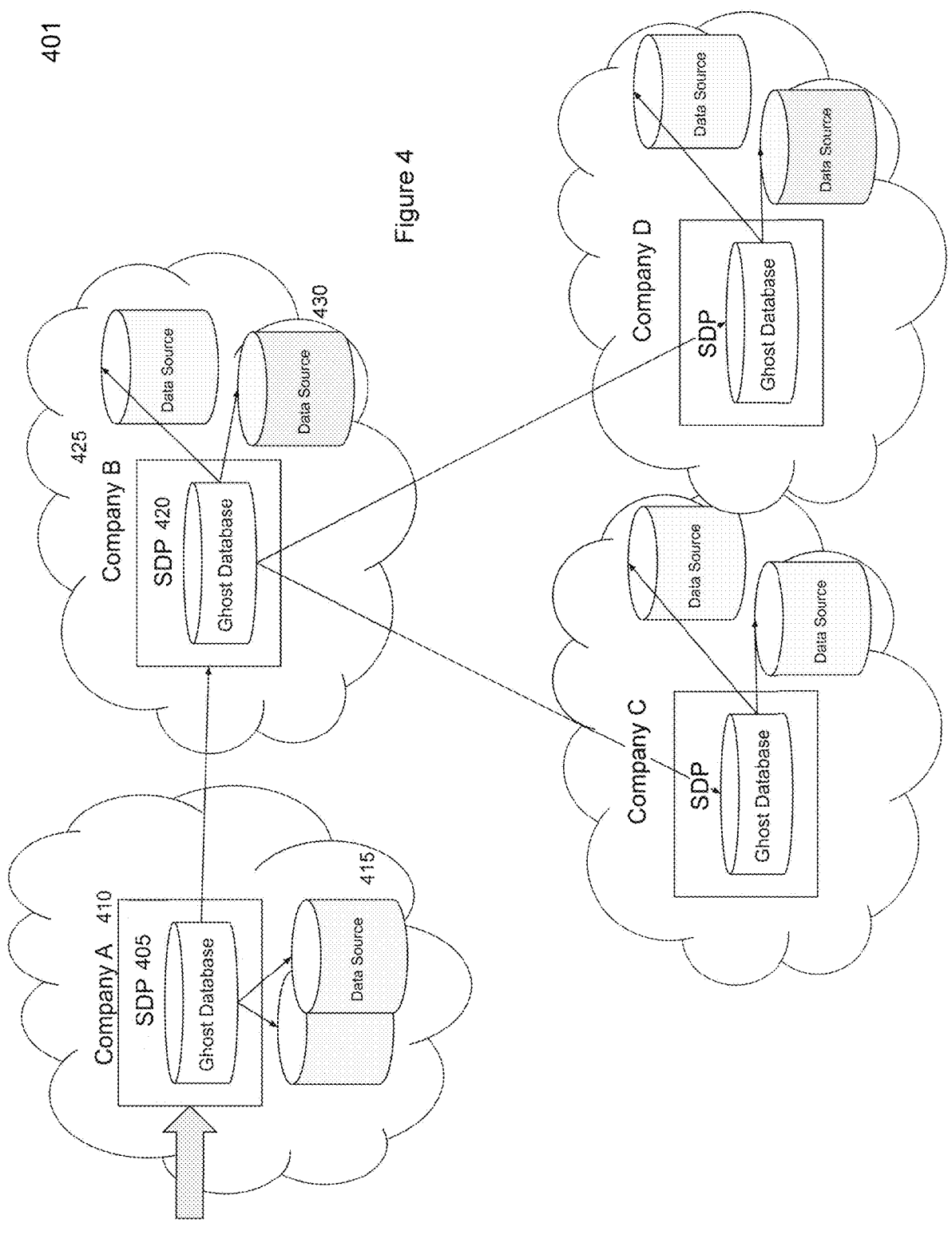
FIG. 4 illustrates an example embodiment of the disclosed technology.

FIG. 4 illustrates an example embodiment of the present technology (401) wherein the system can be used to access a plurality of databases at the same time, retrieve the information from multiple databases, combine the data, process the data, and prepare a response. The plurality of databases may or may not be related. Further, they may be a part of a single organization or may be a part of a plurality of organizations, such as a group of subsidiaries or a federation of organizations. The data access proxy combines information from a plurality of databases to prepare a response. For example, a user is performing a combined study and needs information related to selling shoes within a particular region. For the study, the user would need information from a plurality of shoe-selling companies. The user would request such an information; the request would be routed to a first SDP (405) of a first organization (410) from the plurality of organizations, wherein the plurality of organizations is participating in the study and have granted limited permission to access the limited data from one or more first company data sources (415) as necessary to conduct the study. The first SDP (405), after inspecting the request, access policy, and request attributes, may contact a second SDP (420) of a second organization (425) from a plurality of organizations. The second SDP (420) may perform inspection and retrieve the data from one or more second company data sources (430). Following retrieval of a complete set of data in the form of tables or schemas from the plurality of SDP, the first SDP (405) combines the plurality of data, prepares the data, and presents the results showing combined sales data of shoes sold in a particular region.

The technology further provides methods and systems for preparing a new database in real-time from a plurality of databases without directly accessing the private database. Thus, the technology helps create a new data source from all different data types within a cloud or data server in a short time and without compromising security.

Figure 5:
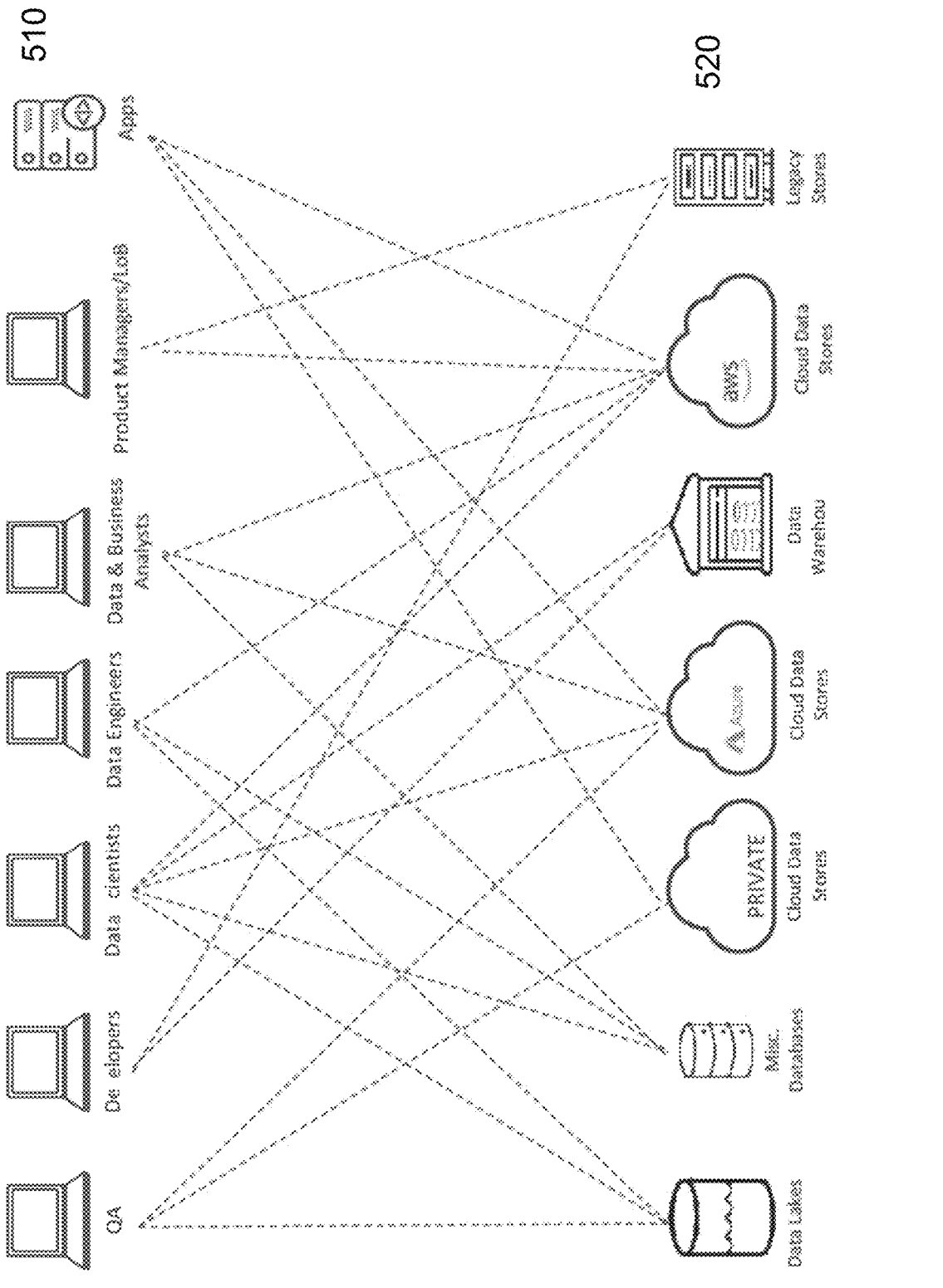
FIG. 5 illustrates the establishment of a direct connection for legacy data access.

FIG. 5 illustrates the establishment of a direct connection for legacy data access. This approach requires extensive resources in terms of time and money for data migration, as well as effort to utilize data from many different source types, and directly puts data access at risk in order to maintain data protection.

For example, it is very costly to migrate data to a unified platform. Much effort can be spent on the unneeded duplication of data. Weeks may be spent manually pulling data to build new datasets. Access to critical resources may be unjustly denied. Additionally, antiquated techniques like printing and redacting may be used at great expense.

As illustrated in FIG. 5, the way data access works today is with many consumers (510) connecting to data silos (520). Direct network connectivity is required to connect applications. As a result, breaches can happen. Direct access to databases where access is not needed can occur. Thus, database dumps of data being stolen from different companies take place daily. Another challenge as illustrated in FIG. 5 is in the situation where one may wish to build a new set of applications and would be required to go into each one of these data silos (520), export data, normalize the data, and then set up a new database to support new applications. From a business operations standpoint, one must deal with mega volumes of data, different versions of the data and different silos in different data centers spread all over the world. One is challenged to pull together analytics and tools to be able to understand all of this. It is thus a challenge for an organization to make sure that only the right people get the right information and that personally identifiable information is not given away.

One of the major challenges becomes how to secure the data that is in these data silos (520) and decide who has access. One can try to deal with this problem by copying voluminous amounts of data and using it in a new place. The downside of this is that one is paying double for storage. Additionally, a copy of the data is put at risk. Generally, it may take about 48 weeks to build a new data set. One alternative approach is to deny access to data altogether. The problem with this approach is that one will stall the operation of their organization.

Figure 6:
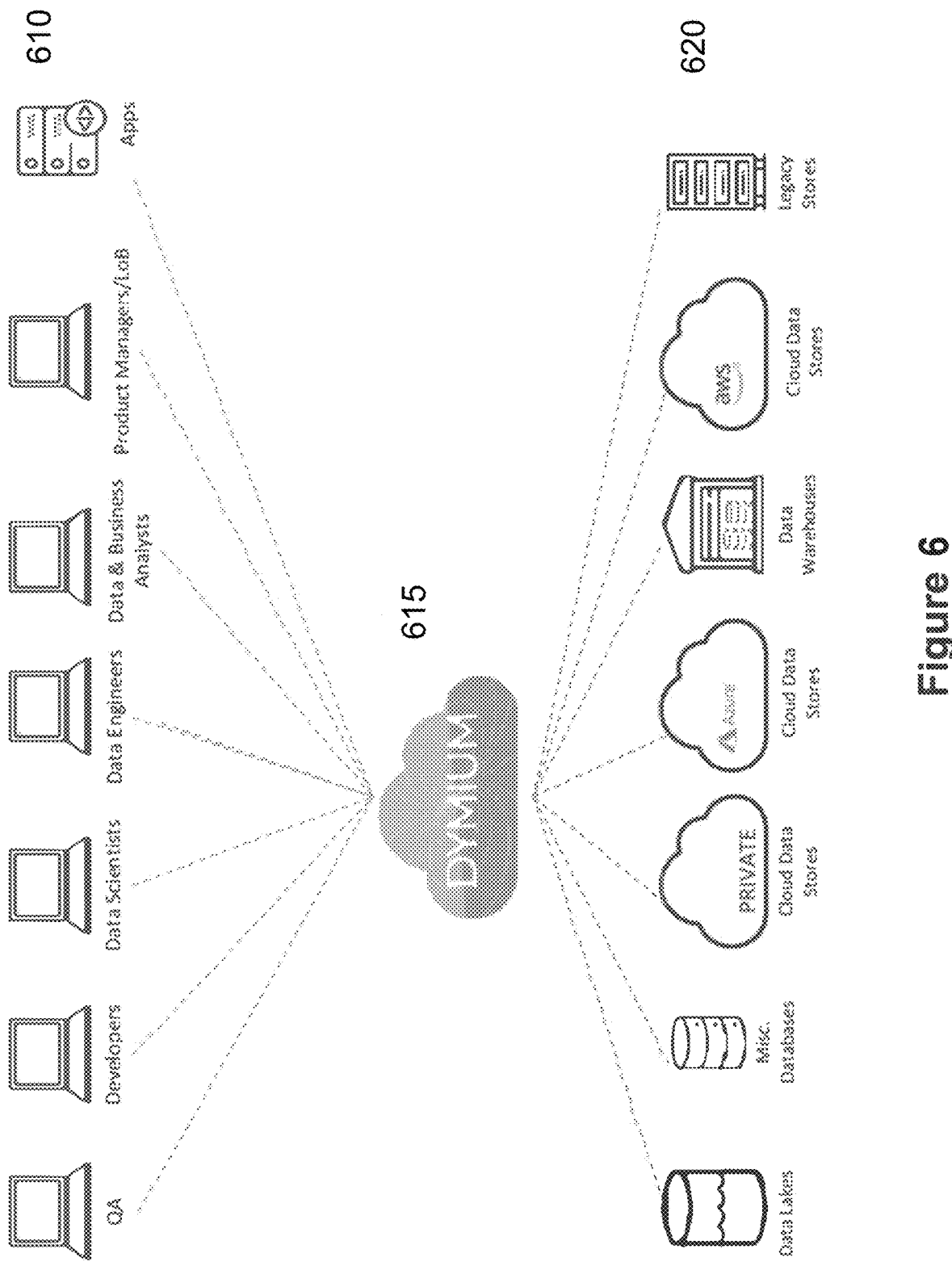
FIG. 6 illustrates an exemplary embodiment that solves the challenges of cost and time associated with a data migration, the time and effort to utilize data from disparate sources, and balances data protection with data access.

FIG. 6 illustrates an exemplary embodiment that solves the challenges of cost and time associated with a data migration, as well as the time and effort to utilize data from disparate sources. This approach balances data protection with data access.

As shown in FIG. 6, no changes are required to infrastructure. One may use an existing Identity and Access Management (IAM) system. There is no need to change data location or format. The exemplary systems and methods shown herein enable zero trust for data use. Personally identifiable information (PII) may be protected, and a complete audit trail may be created. In contrast to FIG. 5, there is not a myriad of direct data connections.

The exemplary systems and methods illustrated herein can enable, within the context of a mega merger of various organizations with different systems, the use of data in a new way across the entire megastructure.

As illustrated in FIG. 6, a service has been built that sits between the data consumers (610) and the data silos (620) in the organization. The virtual databases, otherwise known as ghost databases, pretend to be data silos in the organization so that all data consumers (610) end up talking to a single security front end (615). This single security front end (615) can determine who is querying what and behavior may be collected. Security policies may be developed. Data silos (620) may be in the form of Microsoft, SQL, Oracle, and other forms and can be normalized. Existing data stores do not require migration or other changes. All of these operations may take place very quickly.

As an example, consider a situation where one hotel chain buys another hotel chain. Each chain has different database forms, different cloud storage vendors, and different ways of performing queries. A major challenge for such a company is how to consolidate the set of information to make all data that they have valuable. The exemplary systems and methods herein become one central place that all data resides within. No copies of data need to be made.

It is noted that a network may include one or more networks of the same or different types. The network can be any type of wired and/or wireless public or private network, including a cellular network, a local area network, a wide area network such as the Internet or the World Wide Web (WWW), a personal area network, etc. The network further may comprise sub-networks and consist of any number and types of communication networking devices. Processors may be implemented in hardware and/or firmware.

One or more processors may execute the methods as described herein as understood by those skilled in the art. The instructions to execute the methods as described herein may be carried out by a special purpose computer, logic circuits, or hardware circuits.

The term ' data' may further include any form of data in any suitable format that may be communicated to a computing device (e.g., client device, server, proxy) and/Binary, numeric, voice, video, text, photograph or script data, or any form of source or object code, or the other relevant information.

SDP includes one or more modules configured to protect data designated as private.

In the description, for purposes of explanation and not limitation, specific details are set forth, such as particular embodiments, procedures, techniques, etc., to provide a thorough understanding of the present technology. However, it will be apparent to one skilled in the art that the present technology may be practiced in other embodiments that depart from these specific details.

While specific embodiments of, and examples for, the process and compositions are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel or may be performed at different times.

While various embodiments have been described above, it should be understood that they have been presented by way of example only and not in limitation. The descriptions are not intended to limit the scope of the present technology to the particular forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

What is claimed is:

1. A data security system comprising:

at least one artificial intelligence resource comprising at least one named-entity recognition model, at least one large language model, and at least one artificial intelligence application supported by a neural network; and at least one server communicatively coupled to the artificial intelligence resource and further communicatively coupled to at least one private database, the server configured to operate the artificial intelligence resource to:

identify a user and a request from the user to access at least one data item stored in the private database;

validate the user and the request, the validation including inspecting the user's identity, evaluating permissions and restrictions associated with the user and the data item, and evaluating the user's activity history by directing information associated with the user, including user history and behavior, to the artificial intelligence application supported by the neural network for detecting anomalous or outlier activity of the user, the neural network being trained on query history data to recognize routine and conventional activity associated with a user category for the user;

analyze user activity associated with the user for suspicious activity via a neural network application;

access the private database to retrieve the data item;

inspect one or more security attributes related to the data item via the named-entity recognition model;

transform the data item based on one or more privacy rules via the large language model using results from both the neural network application analysis and the named-entity recognition model inspection, the transformation comprising:

at least one of: redacting information from the data item, deleting information from the data item, substituting information from the data item with other information, and adding information to the data item; and at least one of: substituting synthetic data for the data item, providing the synthetic data as a private data item, and providing proxy data for the data item, the synthetic data or the proxy data being used by the server and the artificial intelligence resource as a tracker to trace data traffic associated with the user;

reconstitute the data item in a response to the request; and transmit the response with a transformed version of the data item to the user or a designated recipient.

2. The data security system of claim 1, wherein the transformed version of the data item includes the synthetic data resembling sensitive information in the data item.

3. The data security system of claim 1, wherein the named-entity recognition model is trained to identify at least one of: personally identifiable information (PII), financial data, medical information, and trade secrets within the data item, and wherein the named-entity recognition model outputs confidence scores for identified sensitive information types.

4. The data security system of claim 1, wherein the named-entity recognition model is configured to detect patterns within database columns and associate identified patterns with known classes of personally identifiable information.

5. The data security system of claim 1, the large language model being configured to generate and validate code for a security measure, including comments within the code that can be used to track a user's subsequent activity.

6. The data security system of claim 5, the code having comments within the code, the comments being used to track the user's subsequent activity.

7. The data security system of claim 1, the artificial intelligence resource further including functionality for optical character recognition.

8. The data security system of claim 1, the artificial intelligence resource further including functionality for text classification.

9. The data security system of claim 1, the artificial intelligence resource further including functionality for image classification.

10. The data security system of claim 1, the large language model further supporting a chatbot and further being trained on organizational legacy resources and access-control lists.

11. A method for data security comprising:

identifying a user and a request from the user to access at least one data item stored in at least one private database, the identifying being performed by an artificial intelligence resource comprising at least one named-entity recognition model, at least one large language model, and at least one artificial intelligence application supported by a neural network, the artificial intelligence resource further being coupled with at least one server configured to operate the artificial intelligence resource;

validating the user and the request, by the artificial intelligence resource, the validating including inspecting the user's identity, evaluating permissions and restrictions associated with the user and the data item, and evaluating the user's activity history by directing information associated with the user, including user history and behavior, to the artificial intelligence application supported by the neural network, the neural network being trained on query history data to recognize routine and conventional activity associated with a user category for the user;

analyzing user activity associated with the user for suspicious activity via the neural network application;

accessing the private database to retrieve the data item by the artificial intelligence resource;

inspecting one or more security attributes related to the data item via the named-entity recognition model;

transforming the data item based on one or more privacy rules via the large language model using results from both the neural network application analysis and the named-entity recognition model inspection, the transforming comprising:

at least one of: redacting information from the data item, deleting information from the data item, substituting information from the private data item with other information, and adding information to the data item; and at least one of: substituting synthetic data for the data item, providing synthetic data as a private data item, and providing proxy data for the data item, the synthetic data or the proxy data being used by the server and the artificial intelligence resource as a tracker to trace data traffic associated with the user;

reconstituting, by the artificial intelligence resource, the data item in a response to the request; and transmitting the response with a transformed version of the data item to the user or a designated recipient.

12. The method of claim 11, wherein the transformed version of the data item includes the synthetic data resembling sensitive information in the data item.

13. The method of claim 11, wherein the named-entity recognition model is trained to identify personally identifiable information (PII), financial data, medical information, and trade secrets within the data item, and wherein the named-entity recognition model outputs confidence scores for identified sensitive information types.

14. The method of claim 11, wherein the named-entity recognition model is configured to detect patterns within database columns and associate identified patterns with known classes of personally identifiable information.

15. The method of claim 11, further comprising generating and validating, by the large language model, code for a security measure, including comments within the code that can be used to track a user's subsequent activity.

16. The method of claim 15, the code having comments within the code, the comments being used to track the user's subsequent activity.

17. The method of claim 11, the artificial intelligence resource further including functionality for optical character recognition.

18. The method of claim 11, the artificial intelligence resource further including functionality for text classification.

19. The method of claim 11, the artificial intelligence resource further including functionality for image classification.

20. The method of claim 11, the large language model further supporting a chatbot and further being trained on organizational legacy resources and access-control lists.

* * * * *